(12) United States Patent
VanBlon et al.

(10) Patent No.: US 11,748,415 B2
(45) Date of Patent: Sep. 5, 2023

(54) DIGITAL ASSISTANT OUTPUT ATTRIBUTE MODIFICATION

(71) Applicant: Lenovo (Singapore) Pte. Ltd., Singapore (SG)

(72) Inventors: Russell Speight VanBlon, Raleigh, NC (US); Roderick Echols, Chapel Hill, NC (US); Ryan Charles Knudson, Durham, NC (US); Bradley Park Strazisar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 183 days.

(21) Appl. No.: 16/687,417

(22) Filed: Nov. 18, 2019

(65) Prior Publication Data

US 2021/0149965 A1    May 20, 2021

(51) Int. Cl.
*G06F 16/9032* (2019.01)
*H04N 21/422* (2011.01)
*H04N 21/41* (2011.01)

(52) U.S. Cl.
CPC . *G06F 16/90332* (2019.01); *H04N 21/41265* (2020.08); *H04N 21/42203* (2013.01); *H04N 21/42222* (2013.01)

(58) Field of Classification Search
CPC ........ G06F 16/90332; H04N 21/41265; H04N 21/42203; H04N 21/42222

USPC ........................................... 704/275
See application file for complete search history.

(56) References Cited

U.S. PATENT DOCUMENTS

| 10,331,312 | B2 * | 6/2019 | Napolitano | G06F 16/489 |
| 2015/0058877 | A1 * | 2/2015 | Lakkundi | H04N 21/439 |
| | | | | 725/19 |
| 2018/0356945 | A1 * | 12/2018 | Gannon | G06F 3/04883 |

* cited by examiner

*Primary Examiner* — John W Miller
*Assistant Examiner* — Omer Khalid
(74) *Attorney, Agent, or Firm* — Ference & Associates LLC

(57) ABSTRACT

One embodiment provides a method, including: receiving, at an information handling device comprising a digital assistant, a user command, wherein the digital assistant is providing a current output; determining whether an attribute of the current output should be modified, wherein the determining is based on a content type of the current output and a request type of the command; and providing a response to the user command; wherein the providing comprises modifying, responsive to determining that an attribute should be modified, an attribute of the current output during provision of the response, wherein the modification and the attribute to be modified are based on the content type and the request type; and wherein the providing comprises continuing the current output with no modification responsive to determining that an attribute should not be modified. Other aspects are described and claimed.

12 Claims, 3 Drawing Sheets

DIGITAL ASSISTANT OUTPUT ATTRIBUTE MODIFICATION

BACKGROUND

As digital personal assistants (DPAs) become a standard in information handling devices, the fluidity of interactions will increase. The variety of the commands received and the potential responses given (e.g., actions performed, audible responses provided, etc.) will increase with time. As the digital assistants become more common, programmers attempt to make the interactions with these systems feel more natural. As the commonality of use grows, new hurdles associated with clear communication between a user and the digital personal assistant become apparent. The addressing and solving of these new issues is what will ultimately propel the use of digital personal assistance into everyday use. The more natural an interaction between a system and user is, the more likely a user will be to continue to use the digital personal assistant.

BRIEF SUMMARY

In summary, one aspect provides a method, comprising: receiving, at an information handling device comprising a digital assistant, a user command, wherein the digital assistant is providing a current output; determining whether an attribute of the current output should be modified, wherein the determining is based on a content type of the current output and a request type of the command; and providing a response to the user command; wherein the providing comprises modifying, responsive to determining that an attribute should be modified, an attribute of the current output during provision of the response, wherein the modification and the attribute to be modified are based on the content type and the request type; and wherein the providing comprises continuing the current output with no modification responsive to determining that an attribute should not be modified.

Another aspect provides an information handling device, comprising: a digital assistant; a processor; a memory device that stores instructions executable by the processor to: receive, at the digital assistant, a user command, wherein the digital assistant is providing a current output; determine whether an attribute of the current output should be modified, wherein the determining is based on a content type of the current output and a request type of the command; and provide a response to the user command; wherein the instructions executable by the processor to provide comprise instructions executable by the processor to modify, responsive to determining that an attribute should be modified, an attribute of the current output during provision of the response, wherein the modification and the attribute to be modified are based on the content type and the request type; and wherein the instructions executable by the processor to provide comprise instructions executable by the processor to continue the current output with no modification responsive to determining that an attribute should not be modified.

A further aspect provides a product, comprising: a storage device that stores code, the code being executable by a processor and comprising: code that receives, at an information handling device comprising a digital assistant, a user command, wherein the digital assistant is providing a current output; code that determines whether an attribute of the current output should be modified, wherein the determining is based on a content type of the current output and a request type of the command; and code that provides a response to the user command; wherein the code that provides comprises code that modifies, responsive to determining that an attribute should be modified, an attribute of the current output during provision of the response, wherein the modification and the attribute to be modified are based on the content type and the request type; and wherein the code that provides comprises code that continues the current output with no modification responsive to determining that an attribute should not be modified.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
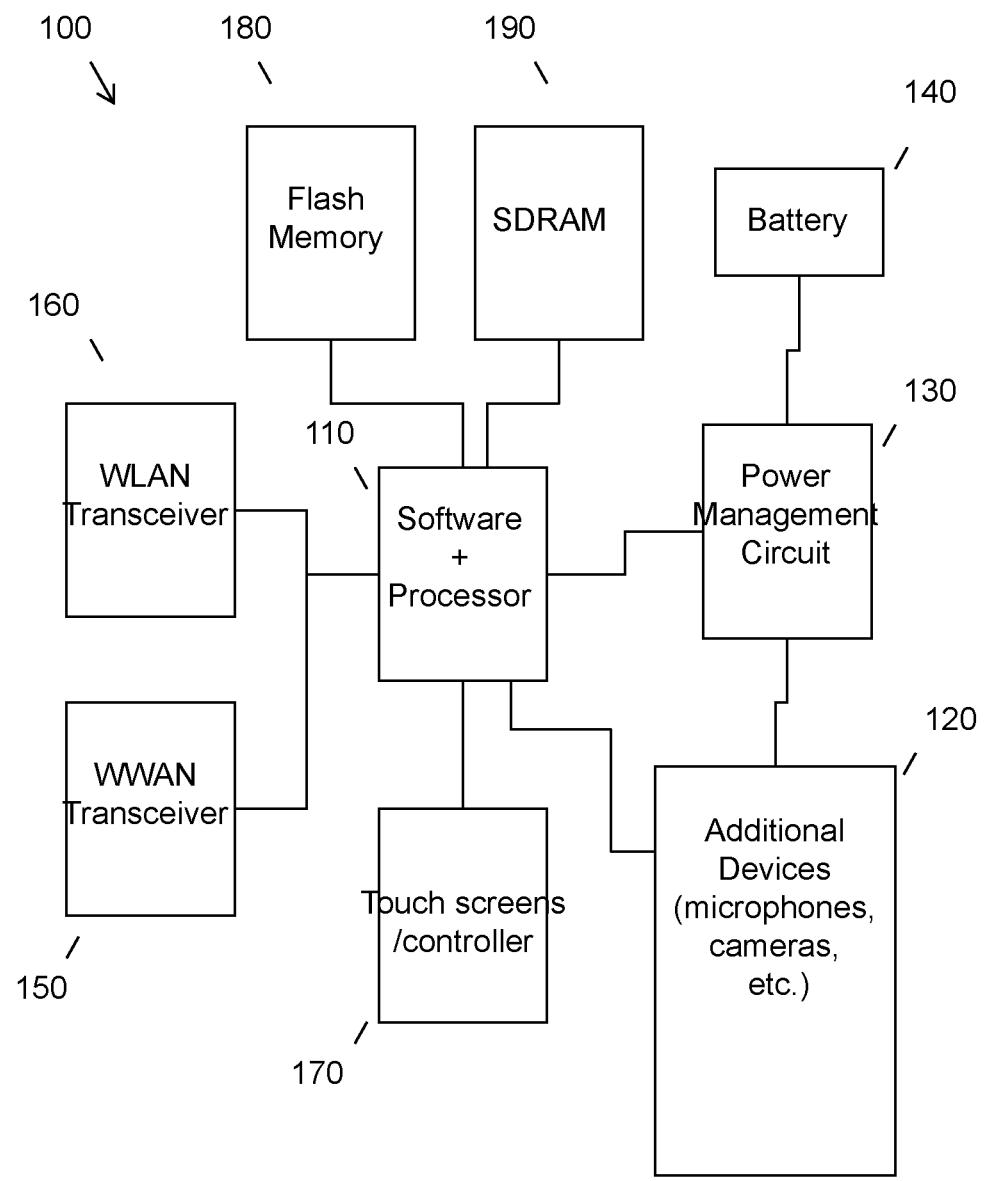
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, when a digital personal assistant (DPA) included in an information handling device (e.g., smartphone, television, laptop computer, stand-alone device, smart watch, etc.) receives a command while the digital assistant is currently providing an output (e.g., playing music, tuned to talk radio, playing a podcast, reading emails, etc.), a system will always mute or pause the current output upon recognition of the wake word provided by a user. The pausing or muting assists the DPA in hearing the command provided by the user. Additionally, in environments containing loud noises (e.g., a party), a DPA may not recognize that a user is attempting to provide a command because a system cannot hear or at least differentiate the user's voice from the surrounding noise to determine a system is attempting to be used.

Conventionally, an environment containing a digital personal assistant must be quiet enough for a system to recognize that a wake word is being said by a user, and must remain relatively quiet while receiving the command to clearly understand a user's command. The presence of multiple voices in an environment following the recognition of a wake word may confuse a system when determining which of the sounds within the environment are directed to the DPA. Thus, the pausing/muting of any playback occurring at the time of recognition of a wake word provides a conventional technique to increase clarity of communication between the digital personal assistant and the user. Accordingly, even though technology has advanced to assist in overcoming problems with noisy environments, DPAs continue to reduce the volume of the current output regardless of the content of the output or the type of command that is being issued by the user.

Accordingly, described herein is a system and method that intelligently modifies attributes of output being provided by a digital personal assistant based on a content type of the output and a request type of a command received by the digital personal assistant. A system may interrupt or may permit continued playback to a occur from a DPA while receiving a user command based upon a variety of factors, for example, the type of response a DPA may provide/the type of command received from the user, the volume of the playback being provided by the DPA, the amount of noise present in an environment, the content type of the current output, and the like. In other words, the system may intelligently determine if an attribute of the playback or current output should be altered based upon a content type of the current output and the type of command received from the user. Altering the playback associated with the DPA may include, but is not limited to, adjusting the volume of playback, stopping playback, rewinding and providing a predetermined amount of playback when resuming a paused current output, and the like.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
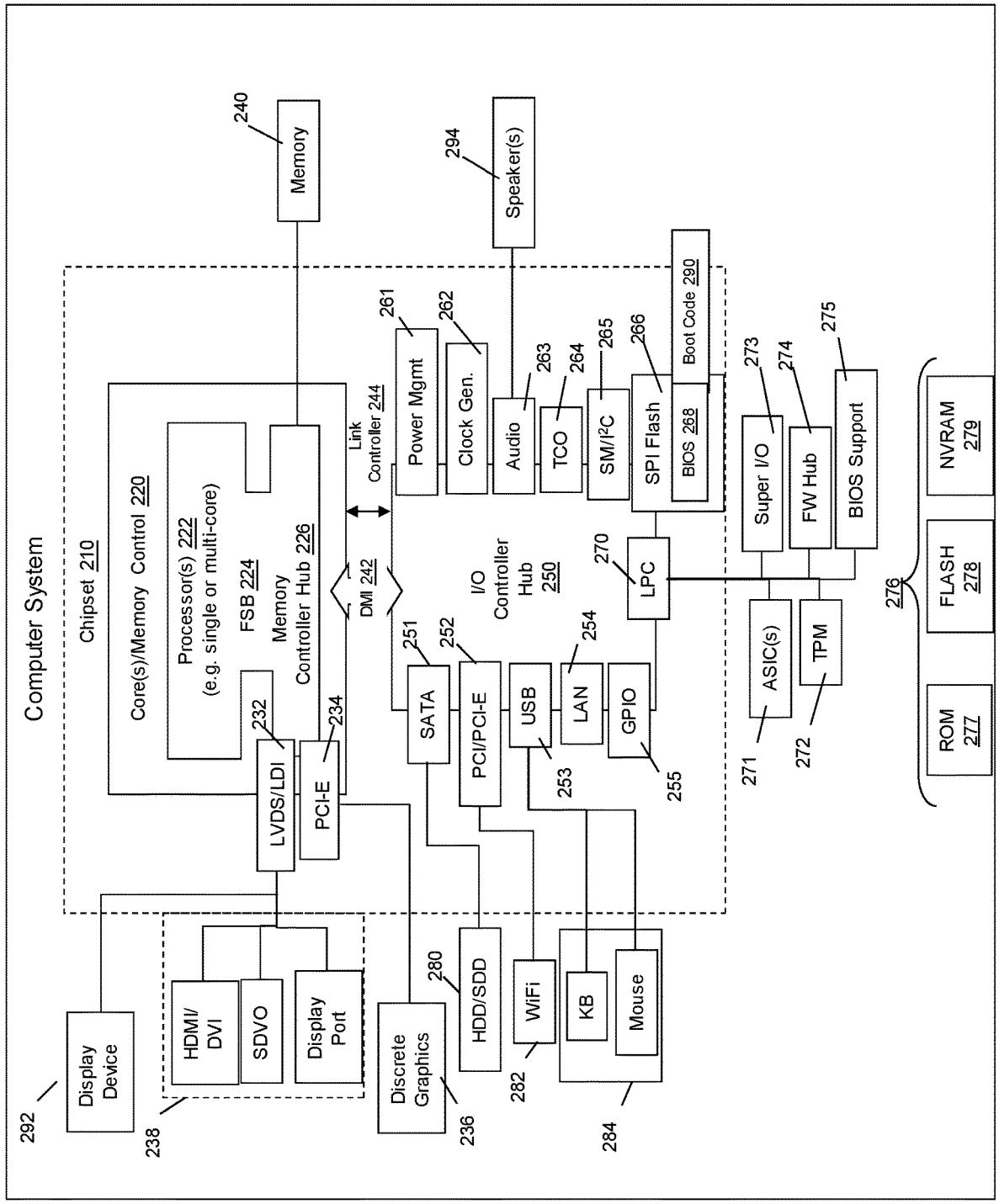
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
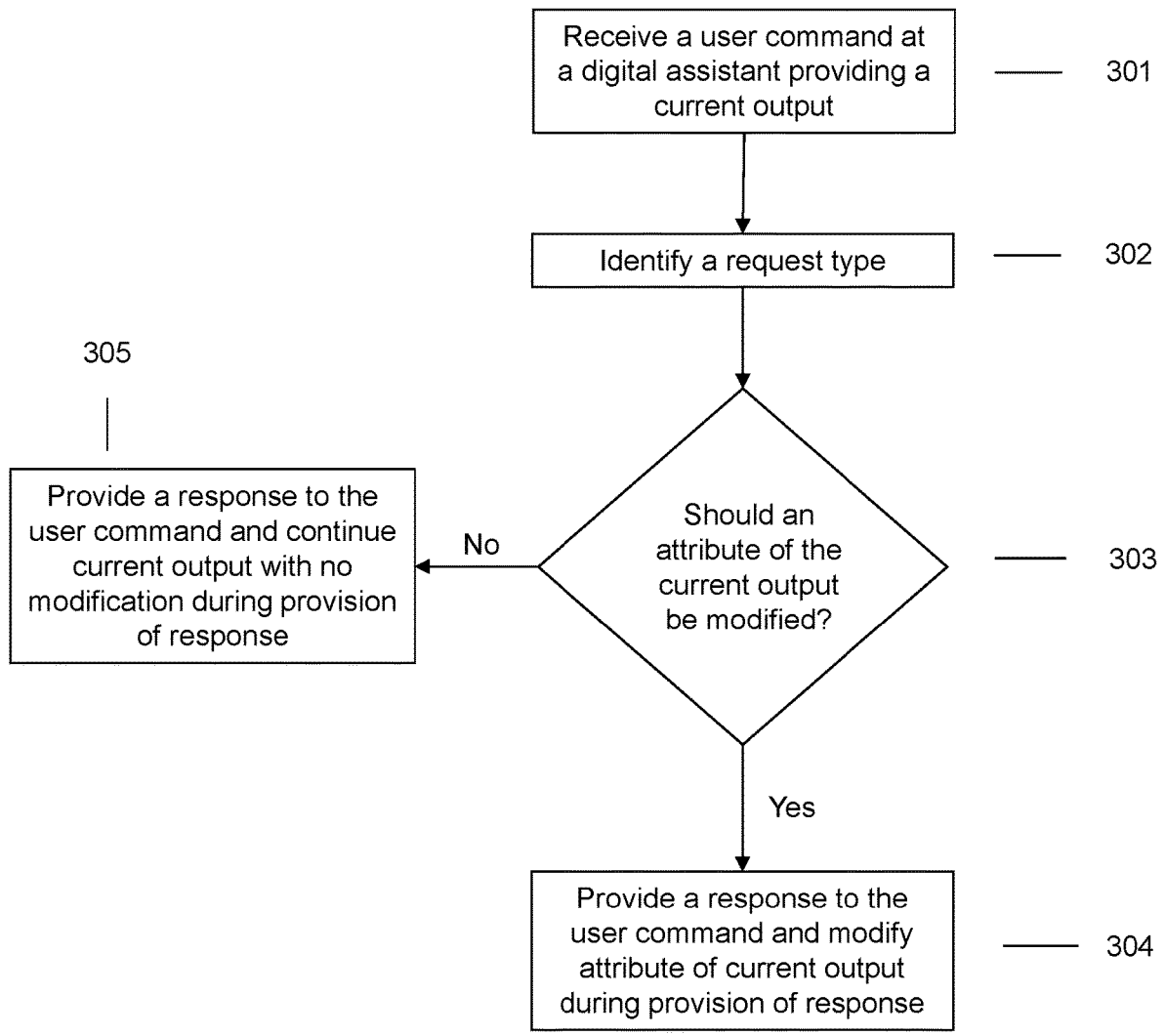
FIG. 3 illustrates an example method of intelligently modifying attributes of output being provided by a digital personal assistant based on a content type of the output and a request type of a command received by the digital personal assistant.

Referring now to FIG. 3, described herein is a system and method that intelligently modifies attributes of output being provided by a digital personal assistant based on a content type of the output and a request type of a command received by the digital personal assistant. A common use of a digital personal assistant is to provide playback to a user. Playback is also referred to as current output herein. Playback includes streaming content, for example, music, news, audio books, podcasts, audible provision of communications (e.g., emails, text messages, etc.), and the like. In other words, the streaming content includes some output where the digital personal assistant is providing a continuous output responsive to some command provided by the user. The providing of such playback may occur for a predetermined amount of time (e.g., the length of a recording, until a stopping point is recognized by the digital personal assistant, etc.) or may be continual until instructed to stop (e.g., music streaming service).

Providing a command to a digital personal assistant may occur in a plurality of ways, for example, through audible input, text input, gesture input, and the like. For ease of readability throughout this description audible input will be discussed. However, this is not intended to be limiting. Providing an audible or verbal input to a system requires a digital personal assistant to recognize, by hearing, that a command is being directed towards a system. The use of a wake word is conventional when using a digital personal assistant. A wake word draws the attention of the digital personal assistant to the user directing a command to the device and allows the digital personal assistant to understand that the user wants the DPA to provide some response to the user. At 301, a system may recognize that a command is being provided from a user while playback is being provided by the digital personal assistant. In other words, the user may provide a wake word or command that the DPA recognizes as being directed toward the DPA and requiring a response by the DPA. This command may be received while the DPA is in the process of providing a current output or playback.

After recognizing that the user has provided a command, the system may identify a request type of the user command at 302. The request type may be a command that requires an action to be performed by the DPA in response (e.g., turning off a light, pausing a movie, setting a reminder, setting a timer, etc.) or may be a command that requires an audible output by the DPA (e.g., answering a question, ordering a pizza, etc.). In other words, the request type may be a background request where the DPA can analyze, process, and respond to the command without interrupting the current output being provided by the DPA, or may be a foreground request where the DPA has to provide an audible output and interrupt the current output being provided by the DPA.

The system may also identify a content type of the current output. The content type may be categorized as streaming content or non-streaming. Streaming content refers to content where the digital personal assistant is providing a continuous output responsive to some command provided by the user, for example, playing music, providing a reading of communications, playing a podcast, playing a radio station, and the like. Non-streaming content refers to content where the digital personal assistant is providing a single output responsive to some command provided by the user, for example, responding to a question, providing an alert, or the like.

Based upon the request type and the content type, the system determines whether an attribute of the current output should be modified or altered at 303. For example, if the DPA recognizes that the content type is streaming and the request type is a foreground request or a request that requires an audible output by the DPA, the system may alter an attribute of the current output. Altering the playback may include pausing, muting, lowering the volume of the playback, and the like. In other words, the system may modify the current output attributes of output volume, output speed, output playback, and the like. The system may make a modification to the current output in order to prevent the user from missing content within the output, for example, missing a song, missing a segment of a news story, missing content within an email communication, and the like. Thus, the system attempts to minimize the disruption of the receipt of a command and provision of a response to the command on the current output.

Depending on the response that may be given by the DPA, different alterations to the playback may occur. In an embodiment, the system may default to pausing or muting the playback for all foreground requests requiring a response. In another embodiment, the system may default to decreasing the volume to a predetermined level of playback when providing a response to a foreground command. In another embodiment, the system default may be based on a selective variable (e.g., length of response, topic of response, topic of current output, length of current output, etc.). For example, a system may pause the current output when the response is greater than 5 seconds long. As a continued example, for responses less than 5 seconds, a system may decrease the volume of the playback without pausing and provide the response from the digital personal assistant over the playback. In other words, the playback and the response may be provided simultaneously with the response being provided at a greater volume for clarity. The user may also configure what attribute and what modification occur upon receiving a user command during the provision of streaming output. The user configured selections may be blanket selections (e.g., the same action occurs regardless of features of the output or the command) or may be different selections that are based upon different features of the output or command (e.g., topic of the output, type of command, response type to the command, etc.).

Thus, if the system determines that an attribute should be modified at 303, the system may provide a response to the command and modify an attribute of the current output during the provision of the response at 304. The modification and attribute that are modified may be based upon the content type and the request type. After providing the response, the system may resume provision of the current output with an unmodified attribute. In other words, the system may revert the current output back to the original attributes and resume the output. Resuming may also include rewinding the output a predetermined length of time to ensure that the user did not miss any of the content included in the output. For example, playback volume may be increased back to a standard listening level. As another example, playback may have never stopped and may be continuous throughout the entre process of receipt of command to providing a response and/or completing an action. As another example, after the outputted playback has been paused, a system may rewind the playback predetermined amount of time (e.g., 5 seconds) to reiterate information from the playback that may have been lost or unheard while a user provided a command. By rewinding and providing the additional time to a user, the user may not miss out on a part of the playback currently being provided by the digital personal assistant.

On the other hand, if the system determines that an attribute should not be modified at 303, the system may provide a response to the command and make no changes to any attributes of the current output during the provision of the response at 305. Determining that an attribute does not need to be modified may occur in two different scenarios. In a first scenario, the digital personal assistant may determine that the command received is a background request or a request that does not require an audible output of the DPA. Since background requests require a system to perform an action in response to receipt of the command, the current output of a digital personal assistant may go unaffected during completion. For example, if a command is received to "turn on the living room light," a system may perform the action of turning on the light without providing a verbal response back to the user; thus, not interrupting the playback currently being provided to user. In a second scenario, the digital assistant may determine that the content type is non-streaming. In this case, the system may not modify any attributes of the current output. Rather, the system may complete the non-streaming output and then provide the response to the new command. Alternatively, depending on the command, the non-streaming content may be terminated upon receipt of the command and not resumed after the response to the new command is provided.

The modification or non-modification of an attribute may be overridden by an environmental context. In other words, if the system would typically not modify an attribute based upon content type and request type, the system may modify the attribute based upon an environmental context. For example, if the DPA has difficulty in understanding the user, for example, the command is broken or confusing, the system may modify an attribute. As another example, if the environment is too noisy for the DPA to understand a command, the system may modify an attribute in order to understand the command.

In order to reduce the possibility of having to modify an attribute the system may utilize noise cancellation techniques or historical data to determine if the system has historically been able to accurately decipher a user command in particular noise levels, with particular groups of users, or the like. In an embodiment, noise cancellation techniques may assist a DPA in recognizing the user providing a command and the command itself. In noisy environments, the use of noise cancellation may be enough to accurately accept a command and successfully perform an action and/or provide a response. However, if the techniques do not work because the environment is too noisy or the historical data indicates that the command will not be accurately interpreted based upon the environmental context, the system may be forced to modify an attribute of the current output regardless of the content type and/or request type.

Thus, in an embodiment where the surrounding environment is considered to have excessive noise, or is too noisy, a system may pause all playback in an attempt to hear the command from a user. The additional noise from the playback being provided, paired with the noise present in the room may make it hard for a system to understand a command. Accordingly, in an embodiment, regardless of the type of command or the content type, when the volume of the surrounding environment alone, or with the addition of the playback, exceeds a threshold value, a system may pause or mute the playback provided by a system.

The various embodiments described herein thus represent technical improvements to conventional methods for altering current playback supplied by a digital personal assistant while accepting and performing a command from a user. Using the techniques described herein, an embodiment may alter the playback based on the type of command received at the DPA and the content type of the current output being provided by the DPA. Responsive to the determination of the type of command received and the content type, an embodiment may alter to the playback based on predetermined guidelines. These guidelines may also be based upon the environment surrounding the digital personal assistant. In another embodiment, historical data may be used to determine the alteration to the playback. An embodiment may thereafter elect to alter the playback based solely on historical data or partially in combination with the predetermined guidelines established. Responsive to determining the type of command and the environment in with a system is located, along with the historical data with passed, similar situations, an embodiment may intelligently interrupt content playback to supply a response associated with a user command, thereby providing a more intelligent DPA system that behaves more naturally and is more user friendly.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device comprising a digital assistant, a user command, wherein the digital assistant is providing a current output;
   determining whether an attribute of the current output should be modified, wherein the determining is based on a content type of the current output and a request type of the command, wherein the content type comprises of one of: a steaming content and a non-streaming content and the request type comprises one of: a background request and a foreground request, wherein the determining comprises determining the attribute should not be modified based upon determining at least one of: the content type comprises a non-streaming content and the request type comprises a background request, wherein the attribute is further modified based upon an environmental context surrounding the digital assistant;
   providing a response to the user command, wherein the providing the response comprises minimizing a disruption of the current output by utilizing at least one of: a noise cancellation technique and historical data, to determine if the user command is decipherable in the environmental context;
   wherein the providing comprises modifying, responsive to determining that an attribute should be modified, an attribute of the current output during provision of the response, wherein the modification and the attribute to be modified are based on the content type and the request type, and the environmental context surrounding the digital assistant, wherein when the environmental context exceeds a threshold value a modification of an attribute is overridden, wherein the modifying an attribute comprises modifying at least one attribute selected from the group consisting of: output volume, output speed, and output playback, to minimize the user missing the streaming content;
   wherein the providing comprises continuing the current output with no modification responsive to determining that an attribute should not be modified; and
   resuming, after providing the response, the current output with the attribute unmodified.

2. The method of claim 1, wherein the content type of the current output comprises streaming content.

3. The method of claim 2, wherein the request type is a background request and comprises a command identifying an action for the digital assistant to perform; and
   wherein the determining comprises determining that an attribute should not be modified.

4. The method of claim 2, wherein the request type is a foreground request and comprises a query requiring an audible response from the digital assistant; and
   wherein the determining comprises determining that an attribute should be modified.

5. The method of claim 1, wherein the resuming comprises rewinding the current output a predetermined time period.

6. The method of claim 1, wherein the modification and the attribute are configured by the user.

7. An information handling device, comprising:
   a digital assistant;
   a processor;
   a memory device that stores instructions executable by the processor to:
   receive, at the digital assistant, a user command, wherein the digital assistant is providing a current output;
   determine whether an attribute of the current output should be modified, wherein the determining is based on a content type of the current output and a request type of the command, wherein the content type comprises of one of: a steaming content and a non-streaming content and the request type comprises one of: a background request and a foreground request, wherein the determining comprises determining the attribute should not be modified based upon determining at least one of: the content type comprises a non-streaming content and the request type comprises a background request, wherein the attribute is further modified based upon an environmental context surrounding the digital assistant;

provide a response to the user command, wherein to provide the response comprises minimizing a disruption of the current output by utilizing at least one of: a noise cancellation technique and historical data, to determine if the user command is decipherable in the environmental context;

wherein the instructions executable by the processor to provide comprise instructions executable by the processor to modify, responsive to determining that an attribute should be modified, an attribute of the current output during provision of the response, wherein the modification and the attribute to be modified are based on the content type and the request type, and the environmental context surrounding the digital assistant, wherein when the environmental context exceeds a threshold value a modification of an attribute is overridden, wherein the modifying an attribute comprises modifying at least one attribute selected from the group consisting of: output volume, output speed, and output playback, to minimize the user missing the streaming content;

wherein the instructions executable by the processor to provide comprise instructions executable by the processor to continue the current output with no modification responsive to determining that an attribute should not be modified; and resume, after providing the response, the current output with the attribute unmodified.

8. The information handling device of claim 7, wherein the content type of the current output comprises streaming content.

9. The information handling device of claim 8, wherein the request type is a background request and comprises a command identifying an action for the digital assistant to perform; and wherein the instructions executable by the processor to determine comprise instructions executable by the processor to determine that an attribute should not be modified.

10. The information handling device of claim 8, wherein the request type is a foreground request and comprises a query requiring an audible response from the digital assistant; and wherein the instructions executable by the processor to determine comprise instructions executable by the processor to determine that an attribute should be modified.

11. The information handling device of claim 7, wherein the instructions executable by the processor to resume comprise instructions executable by the processor to rewind the current output a predetermined time period.

12. A product, comprising:

a storage device that stores code, the code being executable by a processor and comprising:

code that receives, at an information handling device comprising a digital assistant, a user command, wherein the digital assistant is providing a current output;

code that determines whether an attribute of the current output should be modified, wherein the determining is based on a content type of the current output and a request type of the command, wherein the content type comprises of one of: a steaming content and a non-streaming content and the request type comprises one of: a background request and a foreground request, wherein the determining comprises determining the attribute should not be modified based upon determining at least one of: the content type comprises a non-streaming content and the request type comprises a background request, wherein the attribute is further modified based upon an environmental context surrounding the digital assistant; and code that provides a response to the user command, wherein the code that provides the response comprises minimizing a disruption of the current output by utilizing at least one of: a noise cancellation technique and historical data, to determine if the user command is decipherable in the environmental context;

wherein the code that provides comprises code that modifies, responsive to determining that an attribute should be modified, an attribute of the current output during provision of the response, wherein the modification and the attribute to be modified are based on the content type and the request type, and the environmental context surrounding the digital assistant, wherein when the environmental context exceeds a threshold value a modification of an attribute is overridden, wherein the modifying an attribute comprises modifying at least one attribute selected from the group consisting of: output volume, output speed, and output playback, to minimize the user missing the streaming content;

wherein the code that provides comprises code that continues the current output with no modification responsive to determining that an attribute should not be modified; and code that resumes, after providing the response, the current output with the attribute unmodified.

* * * * *